Nov. 8, 1955
D. RAGLAND
2,722,835
RECORDING TANK GAUGE WITH EMBOSSED FACE TAPE
Filed July 19, 1954
2 Sheets-Sheet 1
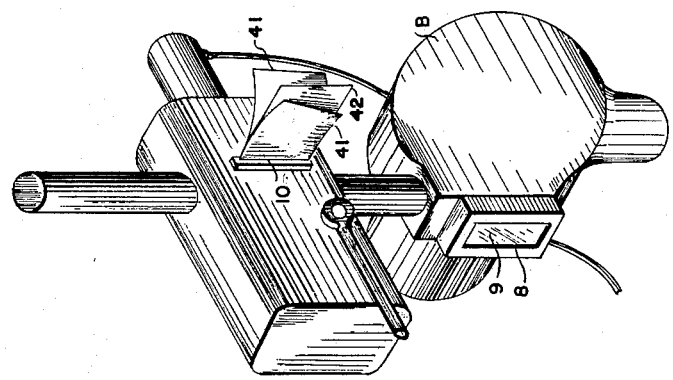
FIG. 5
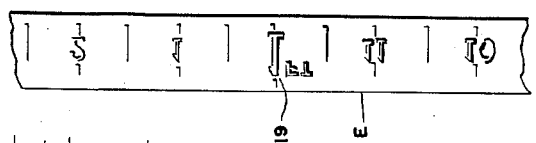
FIG. 2
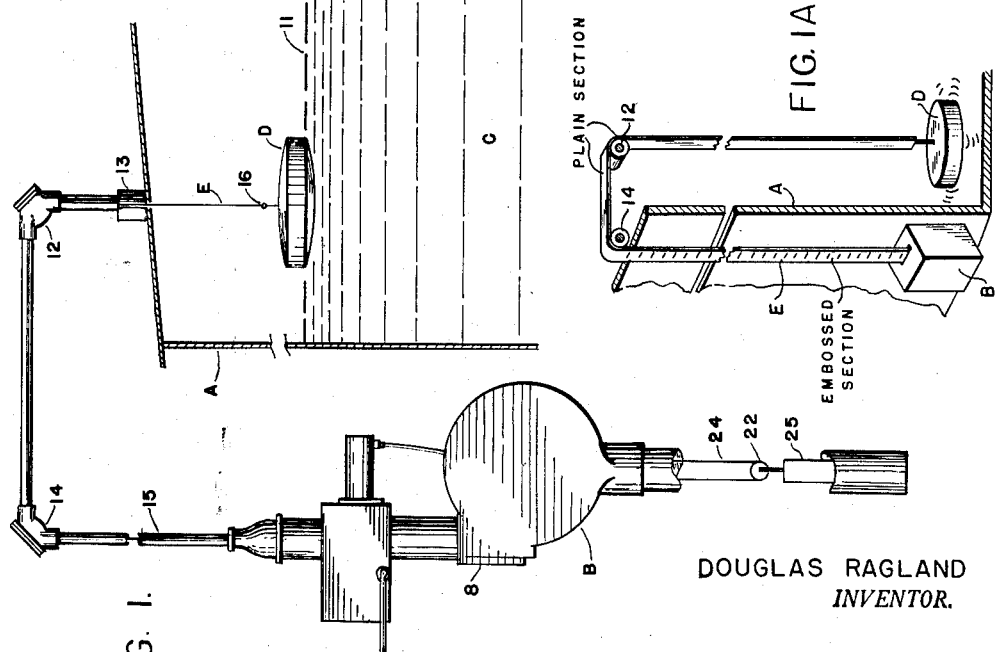
DOUGLAS RAGLAND
INVENTOR.
BY
J.S. McKean Nov. 8, 1955 D. RAGLAND 2,722,835
RECORDING TANK GAUGE WITH EMBOSSED FACE TAPE
Filed July 19, 1954 2 Sheets-Sheet 2
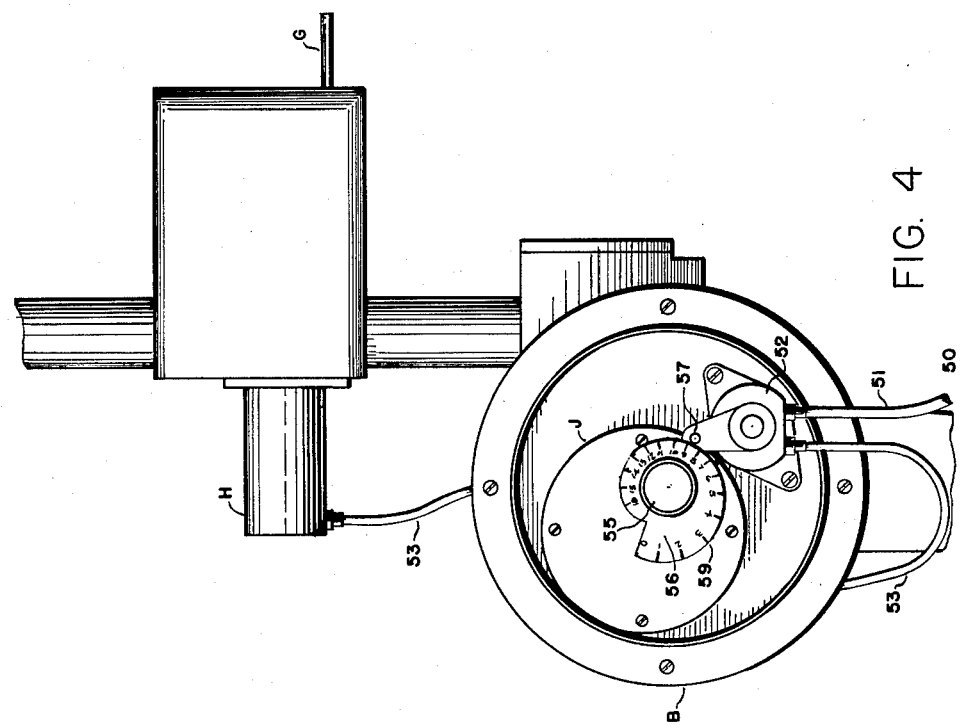
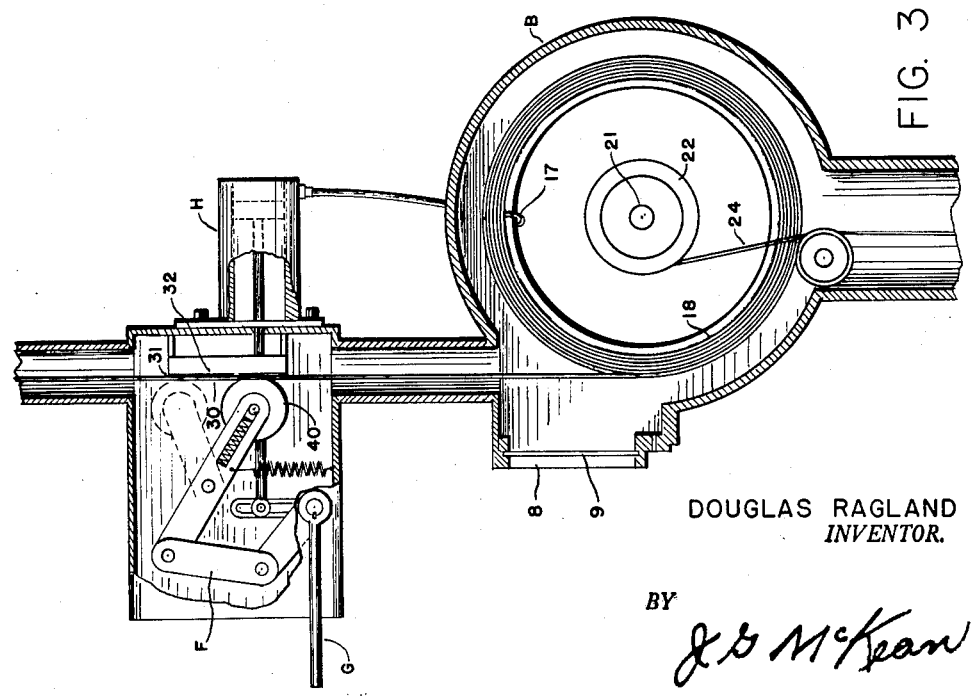
DOUGLAS RAGLAND
*INVENTOR.*
BY
*J. D. McKean*

United States Patent Office 2,722,835
Patented Nov. 8, 1955

2,722,835

RECORDING TANK GAUGE WITH EMBOSSED FACE TAPE

Douglas Ragland, Houston, Tex., assignor, by mesne assignments, to Esso Research and Engineering Company, Elizabeth, N. J., a corporation of Delaware Application July 19, 1954, Serial No. 444,173

3 Claims. (Cl. 73—312)

This application is directed to a recording tank gauge in which the level of liquid in the tank is recorded by means of an embossed or raised face tape.

Advantages and objects of the present invention will be seen from the following description taken in conjunction with the drawing in which Fig. 1 is in the form of an elevation, partly in section, showing an embodiment of the device mounted on a tank in position for recording the level of liquid in the tank;

Fig. 1A is a fragmentary view showing in greater detail parts of the combination of Fig. 1;

Fig. 2 is a fragmentary view showing the tape in Figs. 1 and 1A;

Fig. 3 is an elevation, partly in section, showing details of construction of the recording mechanism of Fig. 1;

Fig. 4 is an elevation, partly in section showing further details of construction of the recording mechanism of Figs. 1 and 3; and Fig. 5 is an isometric view of the recording device of Figs. 1, 3 and 4 with record sheet and carbon paper in position for the printing of a record.

Turning now specifically to the drawing and first to Fig. 1, a storage tank A such as a type suitable for storing crude oil has mounted thereon housing B. The tank contains a body of liquid C and floating on the surface 11 of liquid C is float D. A tape E which preferably is made of a non-corrosive material of substantially durability such as stainless steel has one end attached to float D and runs over pulley 12 through a packing gland 13 at the top of the tank thence over a pulley 14 then through a protective housing or pipe 15 and down into housing B.

Views of tape E showing its relationship with float D and pulley 14 when the liquid level in the tank A is at its minimum or zero reading are shown in Figs. 1A and 2. The end 16 of tape E is attached to float D. The other end 17 of tape E is secured to reel 18 which normally is encased in housing B. The portion of tape E between end 17 and pulley 14 is provided with a suitably embossed or raised face scale 19. The embossed or raised face portion 19 of the tape terminates below pulley 14 and the remainder of tape E is smooth so that in use the raised face portion 18 never passes over pulley 14 and hence never enters tank A.

Details of construction of the recording mechanism are shown in Figs. 3 and 4. Arranged in housing B is reel 18 mounted for rotation on shaft 21. Reel 18 is provided with a tension producing device to keep tape E constantly under tension to eliminate slackness in the tape which could result in inaccurate readings. In the embodiment shown, the tension producing device for reel 18 is a sheave 22 secured to reel 18 by suitable means such as screws 23 with a line 24 wrapped around sheave 22 and fastened thereto and carrying weight 25 on its free end. It will be understood that some other tension providing means such as a spring mechanism may be provided, if desired.

Housing B is provided with a slot 10 through which a carbon paper and recording card assembly may be inserted as seen in Fig. 5. For the purpose of illustration, the sheets of carbon paper 41, 41 are shown with their ends bent away from record card 42. Housing B also has a window 8 with a glass or transparent pane 9 to permit inspection of the interior thereof.

Within housing B, as shown in Fig. 3, is a guide member 30 having a tape receiving slot 31 and a card receiving slot 32, which receives the record card and carbon paper assembly inserted through slot 10 of the housing as previously mentioned and shown by Fig. 5. The axis of tape receiving slot 31 coincides with the plane of the tape as it passes between sheave 14 and reel 18.

A printing roller 40 is mounted on linkage F to housing B. This linkage is arranged to be actuated either by hand lever G or by piston and cylinder assembly H. The printing wheel 40 is normally in the position shown by solid lines, for convenience hereafter called its first posiiton, and is movable to the position shown by dotted lines, for convenience hereinafter termed its second position. As printing wheel 40 is moved from its first position to its second position, it forces a portion of the embossed face portion of tape E into contact with an inserted card and carbon assembly 41, 42, as shown in Fig. 5, against guide member 30 thus recording the tank measurement at the time linkage F is actuated.

The piston and cylinder assembly H is supplied with a suitable power fluid through a fluid power line, such as compressed air from source 50 (which may for example be an air compressor) through compressed air line 51 which is connected to the inlet of valve 52 with the outlet of valve 52 connected through line 53 to the piston and cylinder assembly H. Clock J mounted on housing B with the shaft 55 on which cam 56 is frictionally mounted, is provided as a means for actuating valve 52 at a predetermined time. Cam 56 contacts cam follower 57 which is mounted on the lever 58 which in turn actuates valve 52. When surface 59 of the cam is driven past follower 57, the valve 52 is actuated thus supplying power fluid to piston and cylinder assembly H which thereupon moves roller 40 from its first position to its second position and thus records the depth of the liquid in the tank on a card inserted in slot 32. For example, the clock may be set to record the depth of the liquid in the tank at 7 o'clock in the morning.

The cam 56 is mounted frictionally such that a substantially greater force than usually developed by clock J will cause it to slip on shaft 55. Thus, at any time the operator wishes to use the power means for printing he may simply slip cam 56 on its shaft until surface 59 passes follower 57 at which time the valve 52 opens and allows power fluid to actuate piston assembly H, the operator may then return the cam 56 to its original setting so that subsequently, at the selected time a record will be automatically obtained of the tank level. It will be understood that while both handle G and power actuating means H have been provided for actuating roller 40 that these two means actually supplement each other and that either one or the other may be employed. That is to say, the device may be operated manually without the benefit of assembly H or alternatively that hand lever G may be omitted and the device actuated only by power fluid supplied to piston and cylinder assembly H.

While specific embodiments of the present invention have been disclosed, it will be apparent that various changes may be made such as in the sizes, proportions and arrangement of the parts without departing from the scope of the invention.

I claim:

1. A mechanism for recording the liquid level in a tank comprising, in combination, a mounting means adapted to be mounted on the outside of the tank, a reel carried by said mounting means, a tension exerting means mechanically connected to said reel, a tape having its first end adapted to be secured to a float within the tank and its second end secured to said reel and adapted to extend from said reel over a pulley mounted with its axis parallel to and on an upper part of the tank with that portion of the tape between said pulley and said reel when the float is in its lowest position in the tank provided with an embossed face which is a scale, a guide member carried by said mounting means and having a sheet receiving slot and slidably embracing an embossed portion of said tape, a driving mechanism carried by said mounting means arranged to drive an eccentric member, a printing member actuating means carried by said mounting means carrying said printing member and arranged to move the printing member from a first position to a second position where it exerts a bias on a portion of the embossed face portion of said tape forcing the tape against a sheet placed in the slot into contact with said guide member, and means for supplying power to said actuating means arranged to be operated by said eccentric member.

2. A mechanism for recording the liquid level in a tank comprising, in combination, a mounting means adapted to be mounted on the outside of the tank, a reel carried by said mounting means, a tension exerting means mechanically connected to said reel, a tape having its first end adapted to be secured to a float within the tank and its second end secured to said reel and adapted to extend from said reel over a pulley mounted with its axis parallel to and on an upper part of the tank with that portion of the tape between said pulley and said reel when the float is in its lowest position in the tank provided with an embossed face which is a scale, a guide member carried by said mounting means and having a sheet receiving slot and slidably embracing an embossed portion of said tape, a clock mechanism carried by said mounting means arranged to drive a cam, a printing member, power actuated means arranged to move said printing member from a first position to a second position where it exerts a bias on a portion of the embossed face portion of the tape forcing the tape against a sheet placed in the slot into contact with said guide member and means for supplying power to said power means arranged to be actuated by said cam.

3. A mechanism for recording the liquid level in a tank comprising, in combination, a mounting means adapted to be mounted on the outside of the tank, a reel carried by said mounting means, a tension exerting means mechanically connected to said reel, a tape having its first end adapted to be secured to a float within the tank and its second end secured to said reel and adapted to extend from said reel over a pulley mounted with its axis parallel to and on an upper part of the tank with that portion of the tape between said pulley and said reel when the float is in its lowest position in the tank provided with an embossed face which is a scale, a guide member carried by said mounting means and having a sheet receiving slot and slidably embracing an embossed portion of said tape, a clock mechanism carried by mounting means having a drive shaft, a cam frictionally mounted on said drive shaft, a printing roller, a piston and cylinder fluid actuated power means mechanically linked to said roller for moving it from a first position to a second position where it exerts a bias on a portion of the embossed face portion of the tape forcing the tape against a sheet member placed in the slot into contact with said guide member, and means including a valve arranged to be actuated by said cam arranged to conduct power fluid to said piston and cylinder assembly.

References Cited in the file of this patent

UNITED STATES PATENTS

| | | |
|---|---|---|
| 619,667 | Campbell | Feb. 14, 1899 |
| 1,741,792 | Rinehart | Dec. 31, 1929 |
| 2,568,348 | McCauley | Sept. 18, 1951 |